(12) United States Patent
Shu et al.

(10) Patent No.: US 9,959,053 B2
(45) Date of Patent: May 1, 2018

(54) METHOD FOR CONSTRUCTING NVRAM-BASED EFFICIENT FILE SYSTEM

(71) Applicant: TSINGHUA UNIVERSITY, Beijing (CN)

(72) Inventors: Jiwu Shu, Beijing (CN); Jiaxin Ou, Beijing (CN); Youyou Lu, Beijing (CN)

(*) Notice: Subject to any disclaimer, the term of this patent is extended or adjusted under 35 U.S.C. 154(b) by 246 days.

(21) Appl. No.: 14/980,462

(22) Filed: Dec. 28, 2015

(65) Prior Publication Data

US 2017/0147208 A1 May 25, 2017

(30) Foreign Application Priority Data

Nov. 19, 2015 (CN) .......................... 2015 1 0808309

(51) Int. Cl.
*G06F 12/00* (2006.01)
*G06F 3/06* (2006.01)
*G06F 17/30* (2006.01)

(52) U.S. Cl.
CPC ............ *G06F 3/061* (2013.01); *G06F 3/0659* (2013.01); *G06F 3/0679* (2013.01); *G06F 17/3007* (2013.01); *G06F 17/30168* (2013.01)

(58) Field of Classification Search
None
See application file for complete search history.

(56) References Cited

U.S. PATENT DOCUMENTS 9,213,717 B1* 12/2015 Pawar ............... G06F 17/30171
9,767,015 B1* 9/2017 McKelvie ........... G06F 12/0238
(Continued)

OTHER PUBLICATIONS

Lin, A buffer cache architecture for smartphones with hybrid DRAM/PCM memory, Non-Volatile Memory System and Applications Symposium (NVMSA), 2015 IEEE (Year: 2015).*
(Continued)

*Primary Examiner* — Prasith Thammavong
*Assistant Examiner* — Jason W Blust
(74) *Attorney, Agent, or Firm* — Wayne & Ken, LLC; Tony Hom (57) ABSTRACT

The present invention provides a method for constructing an NVRAM-based efficient file system, including the following steps: S1. determining a file operation type of the file system, where the file operation type includes a file read operation, a non-persistent file write operation, and a persistent file write operation; and S2. if the file operation type is a non-persistent file write operation, writing, by the file system, content of the non-persistent file write operation to a dynamic random access memory DRAM, updating a corresponding DRAM cache block index, and flushing, at a preset time point, the content of the non-persistent file write operation back to a non-volatile random access memory NVRAM asynchronously, or otherwise, copying, by the file system, related data directly between the NVRAM/DRAM and the user buffer. The method of the present invention can not only avoid additional copies and overheads of conventional software layers, but also improve write performance of the NVRAM file system by fully utilizing a characteristic of high write performance of the DRAM, thereby improving overall performance of the system.

9 Claims, 4 Drawing Sheets

(56) References Cited

U.S. PATENT DOCUMENTS

| | | | | |
|---|---|---|---|---|
| 2013/0308383 A1* | 11/2013 | Best | ................... | G06F 12/0638 |
| | | | | 365/185.08 |
| 2014/0281152 A1* | 9/2014 | Karamcheti | ............ | G06F 3/061 |
| | | | | 711/103 |
| 2016/0034225 A1* | 2/2016 | Yoon | ................... | G06F 12/0868 |
| | | | | 711/102 |

OTHER PUBLICATIONS

Fan, I/O-Cache: A Non-Volatile Memory Based Buffer Cache Policy to Improve Storage Performance, Modeling, Analysis and Simulation of Computer and Telecommunication Systems (MASCOTS), 2015 IEEE 23rd International Symposium. (Year: 2015).*

* cited by examiner

Determining a file operation type of the file system, where the file operation type includes a file read operation, a non-persistent file write operation, and a persistent file write operation. — S1

If the file operation type is a non-persistent file write operation, writing, by the file system, content of the non-persistent file write operation to a dynamic random access memory DRAM, updating a corresponding DRAM cache block index, and flushing, at a preset time point, the content of the non-persistent file write operation back to a non-volatile random access memory NVRAM asynchronously, or otherwise, copying, by the file system, related data directly between the NVRAM/DRAM and the user buffer. — S2

METHOD FOR CONSTRUCTING NVRAM-BASED EFFICIENT FILE SYSTEM

CROSS-REFERENCE TO RELATED APPLICATIONS

This application is a continuation in part of, and claims priority to, Chinese Patent Application No. 201510808309.8 with a filing date of Nov. 19, 2015. The content of the aforementioned application, including any intervening amendments thereto, is incorporated herein by reference.

TECHNICAL FIELD

The present invention relates to the field of computer system technologies, and in particular, to a method for constructing an NVRAM-based efficient file system.

BACKGROUND

A new type non-volatile random access memory (NVRAM) has the following characteristics: (1) non-volatile; (2) having a greater storage density than a conventional dynamic random access memory (DRAM); (3) having read and write performance that is several orders of magnitude higher than read and write performance of a conventional flash memory and a hard disk and is close to read and write performance of the DRAM; and (4) having a longer write lifetime than the flash memory. These advantages enable a system designer to construct an efficient persistent storage system based on the NVRAM.

Because the NVRAM has efficient read and write performance, during the past few years, researchers have found that a conventional file system based on a disk and a flash memory is no longer applicable to the NVRAM for the following reasons: (1) Software overheads of the conventional block device layer in the operating system are higher than actual read and write overheads of the NVRAM device. (2) Because performance of the NVRAM storage device is close to performance of the DRAM, the memory cache cannot improve performance but brings about additional data copies, which reduces the performance of the file system. Therefore, in an existing file system (for example, PMFS or EXT4-DAX) that is optimized on the basis of the NVRAM, the memory cache is removed directly, and file data is directly copied between the user buffer and the storage device.

However, a main disadvantage of the existing NVRAM storage device is: the read performance and the write performance are asymmetric, and the write performance is one order of magnitude lower than the read performance. Therefore, copying file data directly between the user buffer and the storage device reduces the write performance of the file system, resulting in suboptimal performance of the file system.

SUMMARY

The present invention is intended to at least solve one of technical issues of the foregoing related technologies to some extent.

Therefore, an objective of the present invention is to provide a method for constructing an NVRAM-based efficient file system. This method can not only avoid additional copies and overheads of conventional software layers, but also improve write performance of the NVRAM file system by fully utilizing a characteristic of high write performance of a DRAM, thereby improving overall performance of the system.

To achieve the foregoing objective, an embodiment of the present invention provides a method for constructing an NVRAM-based efficient file system, including the following steps: S1. determining whether a file operation of the file system is a non-persistent file write operation, comprising determining the file operation as the non-persistent file write operation by determining that the file operation is an asynchronous write operation followed by a file synchronization operation and determining that performance of caching content of asynchronous write operations before the file synchronization operation is higher than performance of writing content of these asynchronous write operations directly to a non-volatile random access memory (NVRAM); and S2. in response to determining the file operation as the non-persistent file write operation, writing, by the file system, content of the non-persistent file write operation to a dynamic random access memory (DRAM), updating a corresponding DRAM cache block index, and flushing, at a preset time point, the content of the non-persistent file write operation back to the NVRAM.

In one embodiment, it is determined that performance of caching content of asynchronous write operations before the file synchronization operation is higher than performance of writing content of these asynchronous write operations directly to the NVRAM if it is determined that a file with which the asynchronous write operation is associated is in a non-persistent state. In one embodiment, once the file system is mounted, the file is initialized to a non-persistent state, and after a first file synchronization operation associated with the file arrives it is determined dynamically whether or not to label the file with a persistent state.

In addition, the method for constructing an NVRAM-based efficient file system according to the foregoing embodiment of the present invention may further have the following additional technical features:

In some examples, the method further includes: determining that the file operation is a persistent write operation, and writing content of the persistent write operation to the NVRAM directly.

In some examples, the method further includes: determining that the file operation is a read operation; determining, by the file system by using a DRAM block index, whether a file block associated with the read operation is in the DRAM; and if the file block is not in the DRAM, further searching, by the file system, for a corresponding address of the file block in the NVRAM by using a block indexing mechanism of the file system, and reading data corresponding to the address directly.

In some examples, the method further includes: if the file block is in the DRAM, reading, by the file system, latest data in cache lines of the DRAM and the NVRAM.

In some examples, it is determined that the file operation is the persistent write operation if: a superblock of the file system comprises a synchronization option and the file operation is a write operation; and/or if an inode structure associated with an opening file comprises an O_SYNC identifier and the file operation is a write operation directed to the opened file.

In some examples, a cache line bitmap module is used to obtain the latest data, wherein the cache line bitmap is at a granularity of interaction between a CPU and a memory.

In some examples, each cache line is of a size of 64 bytes.

The additional aspects and advantages of the present invention will be provided in the following descriptions, and some of them will become more apparent in the following descriptions or be understood through the practice of the present invention.

BRIEF DESCRIPTION OF DRAWINGS

The foregoing and/or additional aspects and advantages of the present invention will become more apparent and understandable in the following descriptions of the embodiments in combination with the accompanying drawings, where.

DESCRIPTION OF EMBODIMENTS

The following describes embodiments of the present invention in detail. Examples of the embodiments are illustrated in the accompanying drawings, where identical or similar numbers always represent identical or similar components or components having identical or similar functions. The following embodiments described with reference to the accompanying drawings are exemplary only and are only used to explain the present invention and should not be understood as limitations on the present invention.

The following describes, with reference to the accompanying drawings, a method for constructing an NVRAM-based efficient file system.

Figure 1:
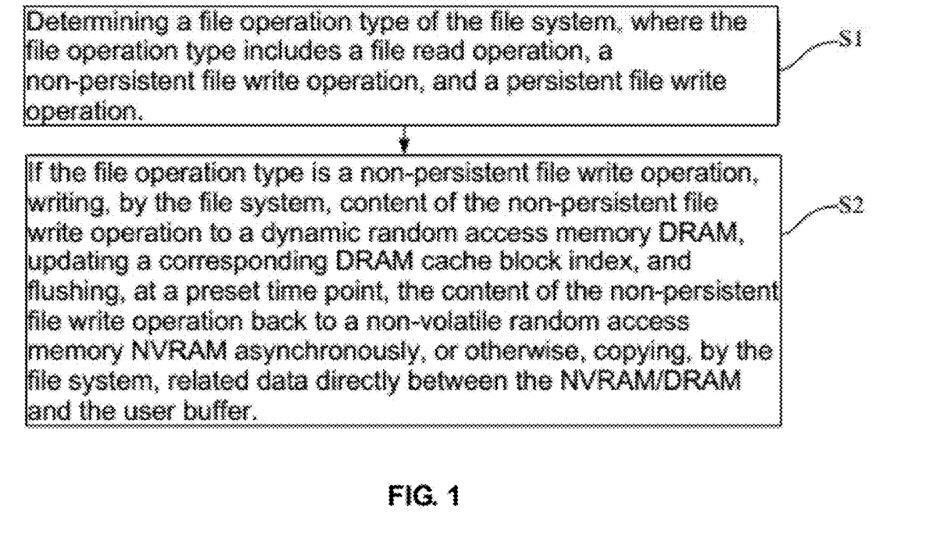
FIG. 1 is a flowchart of a method for constructing an NVRAM-based efficient file system according to an embodiment of the present invention.

FIG. 1 is a flowchart of a method for constructing an NVRAM-based efficient file system according to an embodiment of the present invention. As shown in FIG. 1 the method includes the following steps:

Step S1: Determine a file operation type of a file system, where the file operation type includes a file read operation, a non-persistent file write operation, and a persistent file write operation.

Step S2: If the file operation type is a non-persistent file write operation, the file system writes content of the non-persistent file write operation to a dynamic random access memory DRAM, updates a corresponding DRAM cache block index, and flushes, at a preset time point, the content of the non-persistent file write operation back to a non-volatile random access memory NVRAM asynchronously to avoid high NVRAM write latency overheads, or otherwise, the file system copies related data directly between the NVRAM/DRAM and the, user buffer to avoid double copy overheads.

In an embodiment of the present invention, for the write operation in step S1, the file system determines, for example, by using a persistent write check mechanism, whether the file operation type is a persistent write operation. Step S2 further includes: if the file operation is a persistent write operation, writing content of the persistent write operation to the NVRAM directly to avoid double copies. Further, as described in step S2, if the file operation type is a non-persistent write, operation, the file system writes the content of the non-persistent write operation to the DRAM cache, updates the corresponding DRAM cache block index, and flushes, at a subsequent appropriate time point (preset time point), the content of the non-persistent write operation to the NVRAM asynchronously to, avoid high NVRAM write latency overheads.

For example, the persistent file write operation includes a synchronous write operation and an asynchronous write operation, where the asynchronous write operation is followed by a file synchronization operation. Specifically, for example, if a synchronization option is used when the file system is mounted, all write operations performed on the file system are synchronous write operations. Secondly, if an O_SYNC identifier is used when a file is opened, all write operations performed on the file before the file is closed are synchronous write operations. On the other hand, if an asynchronous write operation is followed by a file synchronization operation, before a next file synchronization operation arrives, if sufficient asynchronous write operations can be combined so that performance of caching content of these asynchronous write operations is higher than performance of writing content of these asynchronous write operations directly to the NVRAM, these asynchronous write operations are defined as non-persistent write operations. Otherwise, these asynchronous write operations are defined as persistent write operations.

Specifically, the foregoing persistent write check mechanism, for example, includes:

(1) if the superblock of the file system includes a synchronization option, determining that all write operations sent to the file system are persistent write operations; and/or (2) if the mode structure associated with an opening file includes an O_SYNC identifier, determining that the write operation of this opening file is a persistent write operation; and/or (3) if a file is in a persistent state, determining that all subsequent asynchronous write operations concerning the file are persistent write operations, or otherwise, if a file is in a non-persistent state, determining that all subsequent asynchronous write operations concerning the file are non-persistent write operations, where a new state called a persistent state is added for each file.

In an embodiment of the present invention, step S2 further includes: if the file operation is a read operation, determining, by the file system by using a DRAM block index, whether a file block associated with the read operation is in the DRAM; and if the file block is not in the DRAM, further searching, by the file system, for a corresponding address of the file block in the NVRAM by using a block indexing mechanism of the file system, and reading data corresponding to the address to the user buffer directly. Further, if the file block is in the DRAM, the file system obtains latest data that the file block stores in the cache lines of the DRAM block and the cache lines of the NVRAM block respectively, and copies the latest data in the cache line to the user buffer. More specifically, for example, by using a cache line bitmap module, the file system obtains the latest data that the file block stores in the cache lines of the DRAM block and the cache lines of the NVRAM block respectively, where the cache line is a granularity of interaction between a CPU and a memory and the cache line is, for example, 64 bytes. That is, the file system determines, by using the cache line bitmap module, which cache line of the file block is in the DRAM block and which cache line is in the NVRAM block, and then copies corresponding latest data from the DRAM and the NVRAM to the user buffer. To reduce the total number of copy commands, for example, a memory copy command memcpy will read a segment of continuous cache lines in a corresponding block to the user buffer, In an embodiment of the present invention, the file system manages the DRAM write cache by using, for example, a fine granularity mechanism to reduce the amount of written back data at the background. More specifically, each DRAM cache block further differentiates, by using the cache line bitmap module, which latest data of a cache line is in the DRAM block and which latest data is in the NVRAM block. In a process of flushing back and reading data to the cache, the file system flushes only data in a corresponding cache line back to the NVRAM or reads the data to the DRAM.

For better understanding, the following further describes in detail, with reference to the accompanying drawings and by using specific examples, the method for constructing an NVRAM-based efficient file system according to the foregoing embodiment of the present invention.

Figure 2:
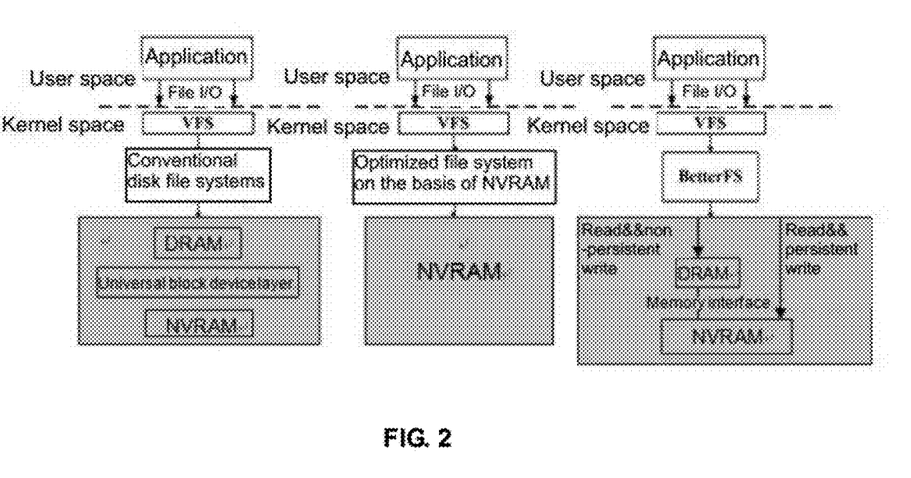
FIG. 2 is a diagram showing a comparison between an architecture of a file system according to an embodiment of the present invention and the architectures of the existing file systems.

FIG. 2 is a schematic diagram showing a comparison between an architecture of a file system of an embodiment of the present invention and architectures of two existing file systems. In FIG. 2, the file system of the present invention is named, for example, BetterFS. Specifically, FIG. 2(a) shows a block-level file system based on a flash memory or a hard disk, where the file system simulates an NVRAM into a block device similar to a RAMDISK and all file read and write operations pass through a memory cache and a block device layer, thereby bringing about double copies and software overheads. FIG. 2(b) shows a new type file system that is designed for the NVRAM. In the file system, the memory cache is removed, and the NVRAM is connected to a memory bus directly; and content of all read and write operations is copied directly between the user buffer and the NVRAM device, thereby reducing double copies and software overheads but causing high overheads of long NVRAM write latency. FIG. 2(c) shows a file system constructed according to an embodiment of the present invention. Two main design objectives of the present invention are as follows: (1) to hide the relatively long write latency of the NVRAM as much as possible, without affecting the overall performance of the file system, (2) to avoid double copy overheads and software latencies as much as possible.

Figure 3:
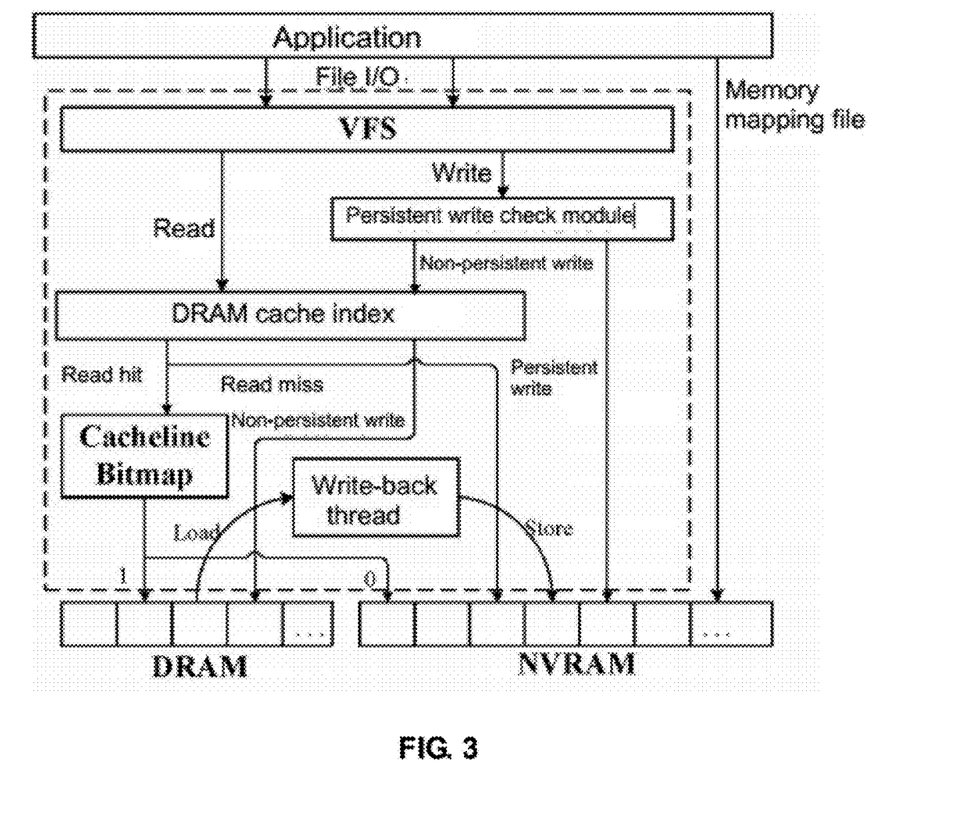
FIG. 3 is a diagram of an architecture of a file system according to an embodiment of the present invention.

As shown in FIG. 3, the file system constructed according to an embodiment of the present invention mainly includes two parts: a persistent write check mechanism and an NVRAM-aware write cache management mechanism. The persistent write check mechanism is used to identify whether a write operation that, an application sends to the file system is a persistent file write operation or a non-persistent file write operation. The NVRAM-aware write cache management mechanism is mainly used to manage a DRAM write cache of the file system, where the write cache temporarily stores content of non-persistent write operations that the application sends to the file system. In addition, the file system of the embodiment of the present invention is different from a conventional block-level file system in that the file system manages the NVRAM directly through a memory interface to avoid a long access latency of the block device layer.

Similar to most of conventional local file systems such as ext3 or ext4, the file system of the embodiment of the present invention provides an asynchronous I/O abstract, that is, the file system neither ensures a sequence between asynchronous write operations nor ensures persistence. If a programmer needs to perform a persistent write operation, the programmer must use a synchronous write operation or a file synchronization operation, for example fsync, to ensure the persistence needed by the application.

Specifically, in the embodiment of the present invention, the file write operation is further classified into non-persistent file write and persistent file write. The definition of persistent file write includes the following two cases: (1) Synchronous write. For example, if a synchronization option is used when the file system is mounted, all write operations performed on the file system are synchronous write operations. Secondly, if an O_SYNC identifier is used when a file is opened, all write operations performed on the file before the file is closed are synchronous write operations. (2) An asynchronous write operation, which is followed by a file synchronization operation In this case, before a next file synchronization operation arrives, if sufficient asynchronous write operations can be combined, so that performance of caching content of these asynchronous write operations is higher than performance of writing content of these asynchronous write operations directly to the NVRAM, these asynchronous write operations are defined as non-persistent write operations. Otherwise, these asynchronous write operations are defined as persistent write operations.

The foregoing persistent write check mechanism is used to identify whether a wrote operation that the application sends to the file system is a persistent file write operation or a non-persistent file write operation. According to the foregoing definition of the persistent file write operation, it is identified easily whether the first case is met, because the state of the file system during mounting may be checked according to content in the superblock of the file system and whether the synchronization option is selected may be checked. In addition, the file open state is also in the mode structure of each file. Therefore, it may be determined, by reading the mode structure of a file associated with the current write operation, whether the O_SYNC identifier is used when the file is opened, and it may be further determined whether the write operation is a persistent write operation. In contrast, the second case is more difficult to identify, because when each write operation of the application arrives, it cannot be determined in advance whether the write operation is followed by a file synchronization operation. In addition, even if it is determined that a file synchronization operation arrives, it is still difficult to know how many write operations concerning the file (assuming that these write operations are cached earlier in the DRAM) can be combined in the cache before the file synchronization operation arrives.

To identify the second case, in the embodiment of the present invention, a cache benefit model is designed to determine whether there are sufficient write operations that can be combined before the file synchronization operation arrives. The cache benefit model is based on a file granularity because the file synchronization operation is also based on this granularity. In this model, a new state, that is, a persistent state, is added for each file. If a file is in a persistent state, all subsequent asynchronous write operations concerning this file are considered as persistent write operations. Conversely, if a file is in a non-persistent state, all subsequent asynchronous write operations concerning this file are considered as non-persistent write operations. The cache benefit model is used to determine the state of each file in the file system.

In the foregoing cache benefit model, it is assumed that: the write latency of the DRAM is $L_{dram}$, the write latency of the NVRAM is $L_{nvram}$, $N_{cw}$ represents a total number of cache lines that a user writes between the current file synchronization operation of a file and the previous file synchronization operation of the file, and $N_{cf}$ represents a total number of cache lines that need to be flushed from the DRAM to the NVRAM in the current file synchronization operation process. If the following two conditions are both met, it may be determined that performance of caching content of asynchronous write operations concerning the file is higher than performance of writing content of asynchronous write operations of the file to the NVRAM.

$$N_{cw}*L_{dram}+N_{cf}*L_{nvram}<N_{cw}*L_{nvram} \quad (1),$$

$$N_{cw}/N_{cf}>\text{Avg\_Evictblock\_Coalesce\_Ratio} \quad \text{condition (2)},$$

where, the foregoing condition (1) represents that if content of the asynchronous write operations concerning the file is first written to the DRAM cache, the total execution time is shorter than the time spent in writing content of the asynchronous write operations of the file directly to the NVRAM. In the condition (2), Avg_Evictblock_Coalesce_Ratio represents an average value of write coalescence ratios of the most recent 1000 cache blocks that are replaced by using a DRAM cache replacement policy. This condition means that caching data of the file does not cause cache pollution to the DRAM cache space because in the file synchronization operation, cache blocks of the file are replaced earlier than the cache blocks that are replaced by using the DRAM caching policy.

When the file system is mounted, all files are initialized to a non-persistent state until the first file synchronization operation of the file arrives. When any file synchronization operation arrives, it is determined dynamically whether a file to which the file operation belongs should be in a persistent state or a non-persistent state. The specific determination process is as follows: it is determined by calculation whether the file meets the foregoing condition (1) and condition (2). If the file meets the two conditions, the file is set to a non-persistent state, that is, content of subsequent asynchronous write operations concerning the file is first written to the DRAM cache otherwise, the file is set to a persistent state, that is, content of subsequent asynchronous write operations concerning the file is directly written to the NVRAM, without passing through the DRAM cache. In addition, if a file does not encounter a file synchronization operation within a period of time, the file is also set to a non-persistent state. This does not mean that the file system determines, by scanning all files at a fixed time interval whether the file does not encounter a file synchronization file within a period of time. On, the contrary, the file system determines the state of the file only when accessing each file. To obtain the value of N.sub.cf, the file system maintains a ghost cache to calculate the total number of cache lines that need to be flushed from the DRAM to the NVRAM during each file synchronization operation. The ghost cache assumes that content of all asynchronous write operations is first written to the DRAM without considering the state of the file. However, the ghost cache does not store file data actually, but stores metadata information of some necessary cache indexes for calculating the value of N.sub.cf. Therefore, a memory space needed by the ghost cache is smaller than 1% of the whole DRAM cache space.

Further, when a write operation is defined as a persistent write operation, if the persistent write operation belongs to the first case, the file system needs to first check whether a latest block related to the write operation is in the DRAM cache; if the block is in the DRAM cache, the file system still writes content of the write operation to the DRAM cache block, and then flushes content of the DRAM block from the DRAM cache to the NVRAM before responding to the user. In this way, content of a next persistent write operation concerning the block may be directly written to the NVRAM. However, this case does not always occur unless the user sends a synchronous write operation and an asynchronous write operation of the same file block alternately. If the persistent write operation belongs to the second case, the file system writes content of the write operation directly to the NVRAM, because in the second case, the file may be set to a persistent state only after a file synchronization operation, but after a file synchronization operation, all latest content of the file must be in the NVRAM.

Further, the foregoing NVRAM-aware write cache management mechanism is mainly used to manage the DRAM cache of the file system. When a write operation arrives, if the write operation is determined to be a non-persistent write operation, data needs to be first written to the DRAM cache. The DRAM cache management (including cache space allocation and cache replacement) of the file system is based on a block granularity. By default, the size of the DRAM cache block is set to 4 KB, which is the same as the granularity of managing the NVRAM by the file system. In addition, the DRAM cache replaces a DRAM cache block by using a least recently written (LRW) policy The file system maintains an LRW List to track temporal locality of write reference of the DRAM cache block. That is, all DRAM cache blocks are arranged in an order of the most recently written time. When a DRAM cache block is written, the block is moved to a most recently written (MRW) location. It should be noted that in the file system, the DRAM cache replacement policy is not limited to the LRW only, and that other effective policies such as least frequently used (LFU) or adaptive replacement cache (ARC) may also be used as the cache replacement policy in the file system n this system, the LRW is used because its algorithm is simple, and most file system workloads show strong locality. Therefore, the LRW ensures a high cache write hit ratio, and software overheads caused by the cache replacement algorithm may be neglected, without affecting the overall system performance of the NVRAM.

Figure 4:
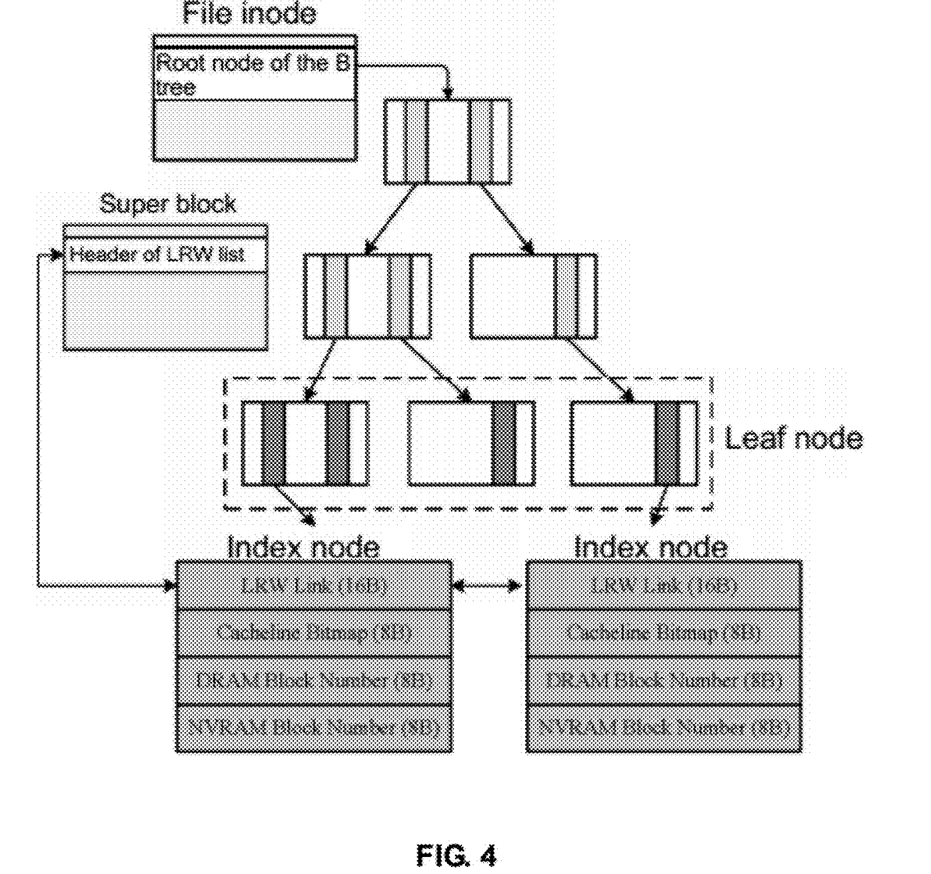
FIG. 4 is a diagram of a DRAM cache block index structure according to an embodiment of the present invention.

Before a block is written to the DRAM cache, the file system determines, by using a cache block index structure shown in FIG. 4, whether the written block already exists in the DRAM. If the block does not exist in the DRAM cache, the system needs to allocate a new DRAM cache block. As shown in FIG. 4, the system manages the cache block index by using a file-based B tree, where the B tree is one of optimal data structures used for indexing a large amount of sparse data. In the B tree index, a key of the index refers to a logical offset, and the size of the logical offset is aligned with the block size of the DRAM cache block. A value (an index node in FIG. 4) of the index includes a physical block number of the DRAM cache and a physical block number of an NVRAM block corresponding to the DRAM cache block. The NVRAM block number is used when a background write-back thread writes back the DRAM block to the NVRAM. A root node of the B tree is stored in the mode structure of each file. In addition, all index node are linked to a global LRW List whose header is stored in the superblock of the file system.

To ensure persistence of data and recycle a corresponding DRAM cache block for subsequent non-persistent write operations, the file system creates multiple independent kernel threads during mounting to ensure that content of a dirty DRAM cache block is flushed into the NVRAM periodically. In general cases, these kernel threads maintain a hibernation state, but these kernel write-back threads will be waked up in the following two cases (1) The first case occurs when only Low.sub.f free blocks are left in the DRAM cache space, where Low.sub.f is a predefined value. In the embodiment of the present invention, the value is set to 5% of the total number of DRAM cache blocks, but Low may also be set to another more effective value.

(2) The second case is that these background threads wake up automatically every 5 seconds, and then flush updated data in the cache back to the NVRAM periodically.

After a background write-back thread is waked up, the background write-back thread first selects some victim blocks at the LRW location of the cached LRW List, and then flushes these victim blocks to a corresponding NVRAM block address through a memory interface (for example, a memcpy( ) function). By using the memory interface, the system performs an I/O operation without passing through a universal block device layer, thereby greatly reducing the software latency. After a data write-back process of a corresponding DRAM cache block is completed, the block is recycled and used in a subsequent non-persistent write operation. According to this manner, the write-back thread recycles multiple DRAM cache blocks at one time until the quantity of free blocks in the cache exceeds another value (marked as High.sub.f), which is set to 20% of the total number of DRAM cache blocks by default and may be adjusted according to different user requirements and system requirements. Subsequently, the write-back thread continues to scan remaining dirty DRAM cache blocks in the LRW List, flushes back data that is updated more than 30 seconds ago to the NVRAM, and then recycles these DRAM cache blocks, in addition, the file system flushes back content of all DRAM cache blocks to corresponding NVRAM blocks during unmounting.

In conventional page cache management, a page is used as a granularity (that is 4 KB). On one hand, when a write operation other than page alignment is performed and a block corresponding to the write operation is not in the DRAM cache, the operating system needs to first read a file system block corresponding to the page to the DRAM cache before writing data of the write operation to the DRAM cache. This mechanism in which the read operation is prior to the write operation greatly affects the system performance because the front-end write operation is blocked by the read operation. On the other hand, even if one DRAM cache block updates data of only several bytes, the background write-back thread also needs to flush a whole DRAM cache block to a storage device. This mechanism not only affects the lifetime of the NVRAM, but also reduces the system performance. This is because when the DRAM cache uses up all free blocks, the background write-back thread also blocks a front-end user thread until a new free DRAM block is available, which means that faster write-back can bring about better system performance.

Therefore, to solve the foregoing problem, the embodiment of the present invention uses, for example, a cache line level fetch/writeback (CLEW) mechanism to track blocks written to the DRAM cache. In the CLEW mechanism, data is read from the NVRAM or written back to the NVRAM in a smaller granularity, where the granularity is set to a granularity at which the CPU reads the memory, that is, a cache line granularity (64 bytes). Therefore, in the embodiment of the present invention, a cache line bitmap is used to track each cache line in the DRAM cache blocks, and each DRAM cache block has a cache line bitmap. If a bit in the bitmap is 1, latest data in a cache line corresponding, to the bit is located in the DRAM cache block, or otherwise, if the bit is 0, it indicates that latest data in a cache line corresponding to the bit is located in an NVRAM block corresponding to the DRAM cache block. In a write-back process of the background, a write-back thread needs to check the cache line bitmap of each write-back block. Only those cache lines corresponding to a bit of 1 need to be flushed back from the DRAM cache block to the NVRAM. For a write operation other than block alignment, when a block corresponding to the write operation is not in the DRAM cache, the system needs only to read latest data of corresponding non-aligned cache lines to the DRAM cache, and does not need to read content of the whole block. For example, assuming the size of the DRAM block of the file system is 4 KB and the size of the cache line is 64 bytes, if a write area of a write operation sent by the user is 0 to 112 byte of a block, in a conventional system, the whole 4 KB (0 to 4096 bytes) block content needs to be read from the storage device to the DRAM cache; however, in the system constructed according to the embodiment of the present invention, only content of the second cache line (64 bytes to 128 bytes) needs to be read from the storage device to the DRAM. In conclusion, the CLFW mechanism greatly reduces useless data fetch and write-back when the system encounters a lot of small and non-aligned write operations, thereby improving the system performance.

In conclusion, in the method for constructing an NVRAM-based efficient file system according to the embodiment of the present invention, a file operation type of the file system is first determined; if the file operation type is a non-persistent file write operation, the file system writes content of the non-persistent file write operation to a dynamic random access memory DRAM dynamically, updates a corresponding DRAM cache block index, and flushes, at a preset time point, the content of the non-persistent file write operation back to a non-volatile random access memory NVRAM asynchronously to avoid high NVRAM write latency overheads; otherwise, the file system directly copies related data between the NVRAM/DRAM and the user buffer to avoid double copy overheads. Therefore, the method can not only avoid additional replications and overheads of conventional software layers, but also improve write performance of the NVRAM file system by fully utilizing a characteristic of high write performance of the DRAM, thereby improving overall performance of the system In the descriptions of the present invention, it should be understood that directions or location relationships indicated by terms "center", "longitudinal", "lateral", "length", "width", "thickness", "up", "down", "front", "rear", "left", "right", "vertical", "horizontal", "top", "bottom", "internal", "external", "clockwise", "counterclockwise", "axial direction", "radial direction", and "circumferential direction" are directions or location relationships based on the accompanying drawings, and are used only for describing the present invention and simplifying the descriptions, which do not represent or imply that a corresponding apparatus or component must have a specific direction and be constructed and operated in a specific direction, and therefore should not be understood as limitations on the present invention.

In addition, terms "first" and "second" are used only for description purposes and should not be understood as indications or implications of relative significance. Therefore, a feature defined with terms "first" arid "second" may implicitly or explicitly include at least one feature. In the descriptions of the present invention, "multiple" means at least two, for example, two or three, unless otherwise defined.

In the present invention, unless otherwise, specified and defined, terms "installation", "interconnection", "connection", and "fixing" should be understood in a broad sense, for example, the connection may be a fixed connection, a detachable connection or an integrated connection, may be a mechanical connection or an electric connection, may be a direct connection or a connection through an intermediate medium, or may be an internal connection between two components or a mutual relationship between two components unless otherwise defined. A person of ordinary skill in the art may understand specific meanings of the foregoing terms in the present invention according to actual situations.

In the present invention, unless otherwise specified and defined, that a first feature is "above" or "below" a second feature may be that the first feature and the second feature are in direct contact, or may be that the first feature and the second are not in direct contact but come Into contact through an intermediate medium In addition, that, the first feature is "above", "over", or "on the top of" the second feature may be that the first feature is directly above or obliquely above the second feature, or only indicates that the level of the first feature is higher than that of the second feature. That the first feature is "below", "under", or "at the bottom of" the second feature may be that the first feature is directly under or obliquely under the second feature, or only indicates that the level of the first feature is lower than that of the second feature.

In the descriptions of the specification, descriptions with reference to terms "an embodiment", "some embodiments", "example", "specific example", or "some examples" shall mean that a specific feature, a structure, a material, or a characteristic described with reference to the embodiment or the example is included in at least one embodiment or example of the present invention. In the specification, exemplary descriptions of the foregoing terms may not refer to a same embodiment or a same example. In addition, the described specific feature, structure, material, or characteristic may be combined in any one or multiple embodiments or examples in an appropriate manner. In addition, in a case of no mutual contradiction, a person skilled in the art may combine and integrate different embodiments or examples and features of the different embodiments or examples described in the specification.

Although the embodiments of the present invention have been illustrated and described hereinbefore, it may be understood that the forego, embodiments are exemplary and should not be understood as limitations on the present invention. A person of ordinary skill in the art may make changes, modifications, replacements, and variations to the foregoing embodiments without departing from the scope of the present invention.

We claim:

1. A method for constructing an NVRAM-based efficient file system, comprising:
    receiving a first file operation of the file system;
    determining the first file operation of the file system is a non-persistent file write operation by:
        determining that the first file operation is a first asynchronous write operation of a plurality of asynchronous write operations followed by a file synchronization operation; and
        determining that performance of caching content of the asynchronous write operations before the file synchronization operation is higher than performance of writing content of the asynchronous write operations directly to a non-volatile random access memory (NVRAM); and
    in response to determining the first operation is the non-persistent file write operation, writing, by the file system, content of the non-persistent file write operation to a dynamic random access memory (DRAM), updating a corresponding DRAM cache block index, and flushing, at a preset time point, the content of the non-persistent file write operation back to the NVRAM asynchronously.

2. The method for constructing an NVRAM-based efficient file system according to claim 1, further comprising:
    receiving a second file operation of the file system;
    determining that the second file operation is a persistent write operation, and writing content of the persistent write operation to the NVRAM directly.

3. The method for constructing an NVRAM-based efficient file system according to claim 1 further comprising:
    receiving a third file operation of the file system;
    determining that the third file operation is a read operation;
    determining, by the file system by using a DRAM block index, whether a file block associated with the read operation is in the DRAM; and
    if the file block is not in the DRAM, further searching, by the file system, for a corresponding address of the file block in the NVRAM by using a block indexing mechanism of the file system, and reading data corresponding to the address directly.

4. The method for constructing an NVRAM-based efficient file system according to claim 3, further comprising:
    if the file block is in the DRAM, reading by the file system, latest data in cache lines of the DRAM and the NVRAM.

5. The method for constructing an NVRAM-based efficient file system according to claim 2, wherein determining the second file operation is the persistent write operation comprises at least one of:
    determining a superblock of the file system comprises a synchronization option and the second file operation is a write operation, and
    determining an inode structure associated with an opening file comprises an O_SYNC identifier and the second file operation is a write operation directed to the opened file.

6. The method for constructing an NVRAM-based efficient file system according to claim 4, wherein a cache line bitmap module is used to read the latest data, wherein the cache line bitmap is at a granularity of interaction between a CPU and a memory.

7. The method for constructing an NVRAM-based efficient file system according to claim 6, wherein each cache line is of a size of 64 bytes.

8. The method for constructing an NVRAM-based efficient file system according to claim 1, wherein the determining that performance of caching content of the asynchronous write operations before the file synchronization operation is higher than performance of writing content of the asynchronous write operations directly to the NVRAM further comprises:
    determining that a file with which the first asynchronous write operation is associated is in a non-persistent state.

9. The method for constructing an NVRAM-based efficient file system according to claim 8, wherein once the file system is mounted, the file is initialized to a non-persistent state, and after a first file synchronization operation associated with the file arrives, it is determined dynamically whether or not to label the file with a persistent state.

* * * * *